(12) United States Patent
Davies

(10) Patent No.: US 10,904,179 B2
(45) Date of Patent: Jan. 26, 2021

(54) SYSTEM AND METHOD FOR VOICE NETWORKING

(71) Applicant: Stephen Davies, Kingston (CA)

(72) Inventor: Stephen Davies, Kingston (CA)

( * ) Notice: Subject to any disclaimer, the term of this patent is extended or adjusted under 35 U.S.C. 154(b) by 7 days.

(21) Appl. No.: 16/191,344

(22) Filed: Nov. 14, 2018

(65) Prior Publication Data

US 2019/0116145 A1  Apr. 18, 2019

Related U.S. Application Data

(63) Continuation of application No. 14/709,767, filed on May 12, 2015, now Pat. No. 10,164,921.

(51) Int. Cl.
| | | |
|---|---|---|
| *H04L 12/58* | (2006.01) | |
| *H04M 3/42* | (2006.01) | |
| *H04M 3/533* | (2006.01) | |
| *H04W 4/12* | (2009.01) | |
| *G10L 15/26* | (2006.01) | |
| *G10L 17/00* | (2013.01) | |

(52) U.S. Cl.
CPC ............ *H04L 51/08* (2013.01); *H04L 51/10* (2013.01); *H04L 51/32* (2013.01); *H04M 3/42221* (2013.01); *H04M 3/533* (2013.01); *H04W 4/12* (2013.01); *G10L 15/26* (2013.01); *G10L 17/00* (2013.01); *H04M 2203/252* (2013.01); *H04M 2203/552* (2013.01); *H04M 2203/655* (2013.01)

(58) Field of Classification Search
None
See application file for complete search history.

(56) References Cited

U.S. PATENT DOCUMENTS

| | | | |
|---|---|---|---|
| 6,252,946 B1 * | 6/2001 | Glowny ................. | H04M 3/36 379/111 |
| 6,529,870 B1 * | 3/2003 | Mikkilineni ...... | H04M 3/53333 379/1.02 |

(Continued)

*Primary Examiner* — Kenny S Lin

(57) ABSTRACT

A system and method for voice based social networking is disclosed. The system receives a voice message (and frequently an image) and ultimately delivers it to one or multiple users, placing it within an ongoing context of conversations. The voice and image may be recorded by various devices and the data transmitted in a variety of formats. An alternative implementation places some system functionality in a mobile device such as a smartphone or wearable device, with the remaining functionality resident in system servers attached to the internet. The system can apply rules to select and limit the voice data flowing to each user; rules prioritize the messages using context information such as user interest and user state. An image is fused to the voice message to form a comment. Additional image or voice annotation (or both) identifying the sender may be attached to the comment. Fused image(s) and voice annotation allow the user to quickly deduce the context of the comment. The system provides the means to deliver a seamless flow of a conversation without requiring user interaction to hear individual comments. Multiple conversations or parts of conversations (or both) are blended into the users acoustic channel without requiring user interaction at the level of individual comments. Advertising may also be integrated. The resulting information flow is translated into formats acceptable to the user's receiving device.

8 Claims, 5 Drawing Sheets

(56) References Cited

U.S. PATENT DOCUMENTS

| | | | |
|---|---|---|---|
| 8,862,593 B1* | 10/2014 | Zureiqat | G06Q 50/01 707/748 |
| 8,972,262 B1* | 3/2015 | Buryak | G10L 15/28 704/251 |
| 9,118,723 B1* | 8/2015 | Su | H04L 67/22 |
| 2003/0177008 A1* | 9/2003 | Chang | G10L 17/26 704/255 |
| 2006/0018446 A1* | 1/2006 | Schmandt | H04M 3/53383 379/88.17 |
| 2007/0220092 A1* | 9/2007 | Heitzeberg | H04L 12/1818 709/204 |
| 2009/0067593 A1* | 3/2009 | Ahlin | H04M 1/642 379/88.22 |
| 2009/0259970 A1* | 10/2009 | Hawkins | G06Q 10/10 715/810 |
| 2010/0251137 A1* | 9/2010 | Qureshi | H04L 51/32 715/752 |
| 2011/0021178 A1* | 1/2011 | Balasaygun | G10L 25/48 455/413 |
| 2012/0020297 A1* | 1/2012 | Cecchini | H04L 65/1069 370/328 |
| 2012/0077465 A1* | 3/2012 | O'Neill | H04L 51/26 455/412.1 |
| 2012/0209902 A1* | 8/2012 | Outerbridge | G06Q 10/101 709/201 |
| 2012/0253807 A1* | 10/2012 | Kamano | G10L 25/63 704/240 |
| 2012/0310393 A1* | 12/2012 | Stewart | H04M 1/72522 700/94 |
| 2013/0097246 A1* | 4/2013 | Zifroni | G06Q 50/01 709/204 |
| 2014/0163980 A1* | 6/2014 | Tesch | G10L 21/10 704/235 |
| 2014/0164927 A1* | 6/2014 | Salaverry | G06F 3/16 715/727 |
| 2014/0325395 A1* | 10/2014 | Itakura | H04M 3/56 715/753 |
| 2015/0205568 A1* | 7/2015 | Matsuoka | G10L 15/00 704/246 |
| 2018/0342251 A1* | 11/2018 | Cohen | G10L 13/08 |

\* cited by examiner

SYSTEM AND METHOD FOR VOICE NETWORKING

CROSS-REFERENCE TO RELATED APPLICATIONS

This is a continuation of application Ser. No. 14/709,767, filed May 12, 2015, with title "System and Method for Voice Networking" and naming Stephen Davies as inventor the entire content of which is hereby incorporated herein by reference.

BACKGROUND

1. Field of Art

The disclosure relates to the field of electronic communications. More specifically, it relates to sharing voice messages and images amongst a plurality of users.

2. Description of the Related Art

In the past decade, the field of social networking has emerged as a major public phenomenon. While social networks have a broader definition amongst academics, here our interest is in electronic social networking services that facilitate electronic interactions amongst groups of users. Two of the most well known social networks are Twitter and Facebook. Twitter facilitates the distribution of a short message to the followers of the message creator, and, to those who have indicated an interest in the subject matter of the message; it also provides means for creation and reception of the message amongst a plurality of device technologies. Facebook is oriented to sharing information amongst users mutually identified as friends.

The information shared in current social networks is primarily in the form of text and images. These contributions are typically presented on a timeline following a progression from latest to oldest. Further, the contributions may be grouped into a sequence rooted to a single contribution, thus forming a conversation. Extensions have permitted the inclusion of web references and multi-media, through the incorporation of Universal Resource Locators (URLs) and multi-media file links. These extensions present to the user a summary of the linked information and invite the user to select the viewing of the web page or the playback of the multi-media.

More recent commercial offerings such as Snapchat and BlipMe developed richer social networks based on multi-media. Snapchat facilitates the creation of short (approximately 15 second) videos and the sharing of those with selected other users. These users must physically select the video for playback and may view the video only once. More recent functionality allows the editing of multi-media into a composite message (a story). BlipMe offered a point to point click to send/playback audio service (i.e. 'walkie-talkie') and a broadcast service where users followed other users and posted audio 'blips' heard by all their followers. One review of the later service noted user confusion with the broadcast stream of comments from multiple sources.

Mobility as evidenced by the rise of smartphones, tablets, in-car and wearable devices is of growing importance to consumers, commercial enterprises and government. For the mobile user, activities such as typing text and scrolling and selecting screens demand a level of attention that is difficult to maintain in a complex and dynamic real-world environment. Audio, as evidenced by hands-free cellphone conversations, offers a viable means of social interaction. However, the human capacity for audio information is finite—we have difficulty listening to multiple speakers at the same time and each can only speak so fast to be intelligible.

Voice may play a major role in mobile social networking. Means for sharing involving less mechanical interaction are needed. A mechanism for engaging effectively in multiple on-going conversations while limiting user load is desirable. A mechanism for quickly providing context is needed. The solution should work across a plethora of mobile devices.

SUMMARY

A system and method for voice based social networking is disclosed. The system receives an electronically encoded voice message (and frequently an image) and ultimately delivers it to one or multiple users. The voice and image may be captured (converted into data records) by various devices and the data transmitted to the system in a variety of formats such as Multimedia Messaging Service (MMS), email, web form input or Application Program Interface (API) call. An alternative implementation places some system functionality in a mobile device such as a smartphone or tablet computer, with the remaining functionality resident in system servers attached to the internet. In either case, the system receives the data and places it within an ongoing context of conversations.

Recognizing the finite capacity of the voice channel, the method calls for the application of rules to select and limit the voice data flowing to each user; rules prioritize the messages using context information such as, but not limited by, current conversations being shown the most interest by the user, importance of sender and current user state. Current user state may reflect time of day and, where provided by the device, location, acoustic and accelerometer data.

The method fuses a coincidentally uploaded image, if present, to the voice message. In the absence of a coincidentally uploaded image, a copy of the last uploaded image before the point of the sender's current interest in the conversation is fused to the voice message. This fused structure is considered a comment. A conversation is a sequence of comments from different users involved in the conversation. The image associated with each comment allows the user to maintain context and quickly identify the conversation when multiple conversations are being monitored. The method incorporates image or voice annotation (or both) identifying the sender to further provide context to the user.

The system provides the means to deliver a seamless flows of a conversation without requiring user interaction to hear individual comments. The selection rules engine provides means to blend multiple conversations or parts of conversations (or both) without requiring user interaction at the level of individual comments. Advertising may also be integrated. The resulting information flow is translated into formats acceptable to the user's receiving device, ranging from a programmed sequence of view and sound on a smartphone to a video on a web client.

The method beneficially provides to the user a social network where voice is the dominant medium, thus permitting the user to allocate significant attention to activities outside of interacting with this network. It beneficially provides a methodology to limit intrusion by controlling the number of comments. The method beneficially features cues to allow the user to maintain an internal concept (context) for the conversation with minimal attention. In turn, these cues require minimal effort on the part of the sender.

Beneficially, the images associated with comments ensure that the recipient will see what the sender intended and not what a dynamic web page may show at a later date. For wearable devices with limited display resolution, power, bandwidth and compute power, the method beneficially provides an efficient scheme for social interaction. This efficiency provides all users with a cost saving with respect to user service provider data charges. Additional features and advantages will be apparent to one of ordinary skill in the art on review of the drawings, specification and claims.

DETAILED DESCRIPTION

Figure 1:
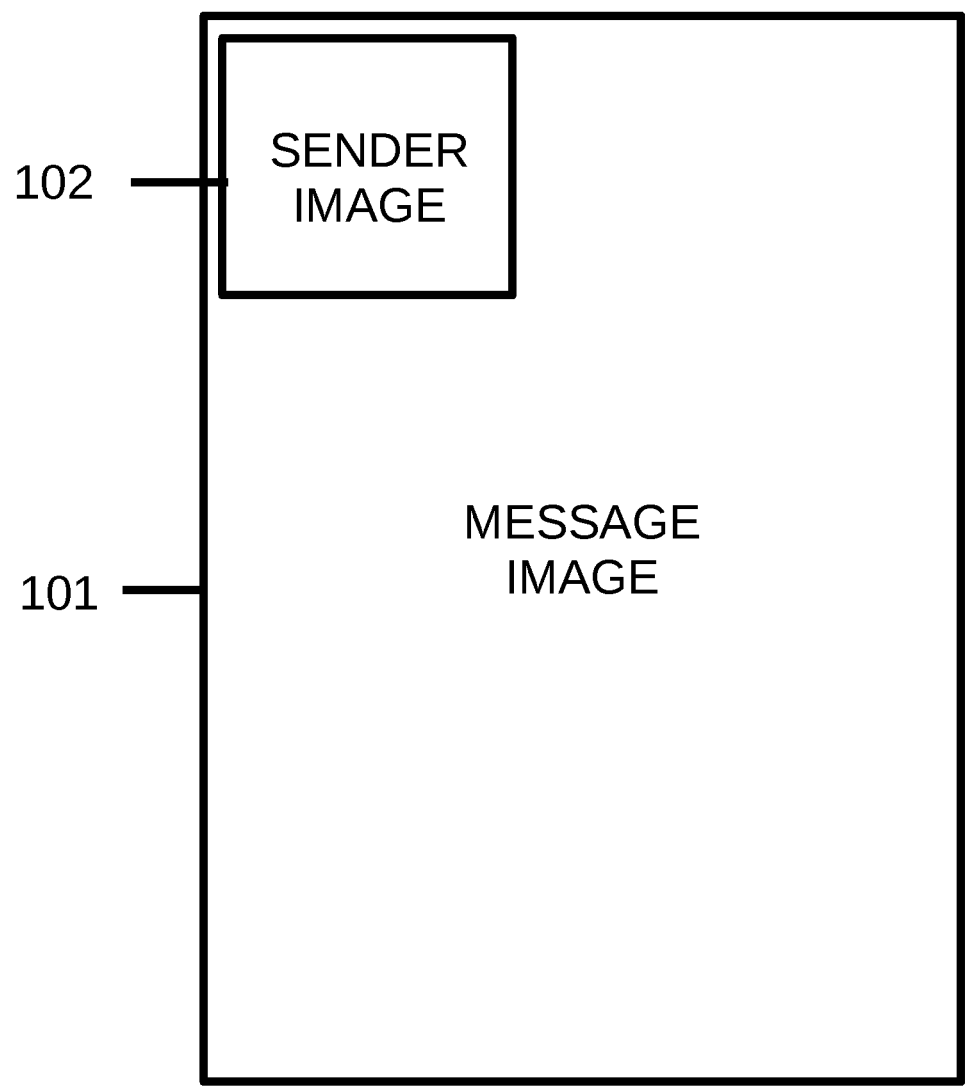
FIG. 1 Illustrates an embodiment of the composite image presented to the user.

Mobile social network users have strong constraints. In particular, they have demands from the environment outside of their device. While driving an automobile is an extreme example, being a safe pedestrian requires attention to activity around the user. Below issues of safety, there are situations where politeness may demand that the bulk of attention be directed at nearby people. Other use cases may include joggers or persons engaged in an activity that they consider to be their main focus but who may want to follow and occasionally contribute to an on-line social activity. For all these examples, a minimally demanding social network is desirable.

A system where voice is the dominant medium, extended to include mechanisms to limit intrusions and efficiently maintain context, is beneficial in these cases as it allows eyes and hands to be used elsewhere. Later in this description, a methodology to limit intrusion by controlling the number of comments is described. In the next few paragraphs, the concept of maintaining context is clarified and a method described to facilitate the maintenance of context.

The context of a message incorporates who is sending it and what previous comments, if any, to which it applies. Maintaining context is defined as ensuring that the user is aware of the context of each message at all times. A brute force means of maintaining context could provide a screen full of text listing every message and sender in the 'conversation' as well as a title for the conversation; more extended conversations would require multiple screens. By reading this screen(s), the user would know the context at the cost of significant attention and time. For a user following multiple conversations, multiple screens would be needed and a significant imposition on the user's concentration would be implied. Further, on the part of the sender(s), the text entry necessary may also be demanding.

The invention trades such exhaustive detail for a system of cues that aid the user in maintaining context in his mind.

The first cue is the association of every comment with a photograph. The voice message may then be inferred to relate to the subject matter of the photograph.

The root or first message in the conversation is special. Its photograph (photo) plays the same role as the title might if a written transcript was created. It sets the topic matter. It is likely that more attention will be paid to this first photo, and that the conversationalists will return to this photo several times. On first appearance, the detail in the photo may be important to understanding the issue to be discussed. After its first appearance: the photo may be recognized very quickly; it will not require detailed examination as its salient features are still fresh in the recipients' minds; and, a very short glance will remind one of the conversation and its topic. While voice is providing the fresh information, the photo is now acting as the title, much as the title may appear on the top of pages within each chapter of a printed book.

Similarly, consider other comments in the conversation where the sender has attached a different photo than the root photo. This new photo is likely to be strongly related to the root photo. For example, the root photo might show a flat bicycle tire and the voice message may be "can some one tell me how to fix this flat?" At some point later in the conversation, a photo of a different bicycle with the tire off one wheel may be uploaded and the attached voice message might be "once you get the tire off the wheel you can start to patch it". There may be an interchange of several comments concerning this new photo so the photo would be used in several comments. But in these comments, a glance at a screen, rather than a detailed examination, is sufficient to say that the user is listening to the flat tire conversation.

With photos likely to be strongly related, each now serves as a label for the conversation. Image details are not important with respect to this label. With respect to the previous example, the detail required to serve as a label is just that a wheel may be seen. Not just a label, the picture is essentially a conversation icon and as an icon its meaning can be inferred quickly and easily. As an icon, it is comprehensible on small low resolution screens. The instant invention envisages that this scheme may be used in conjunction with a wearable device such as a watch. The user may be listening to the network, and, if he needs a reminder of the subject, just flicks the wrist, glances at the watch for an instant, comprehends the icon, returns to listening, restores the wrist to its activity before seeking the watch, and allows the eyes to return to the external environment. The receiving user benefits as demand for his attention and time is reduced.

Further, the alternative of detailed lists of context information requires the user to filter the information into a cognitive mapping that identifies the conversation in his/her mind. The brain evolved first as an image processing engine and more naturally organizes image information rather than text. This suggests that information presented in images as in the instant invention will be processed more easily to the benefit of the user.

Note that this is fundamentally a different paradigm than that expected for a watch based wearable device. The usual paradigm is that the watch serves as an alert of incoming information. The user looks at the watch to get a short text message or to get a link to details to be found on the user's primary device (e.g. smartphone). In the different paradigm, the user looks not at the screens to process an alert but rather to restore (maintain) context for his primary information flow.

Note, beneficially, that providing this cue requires minimal effort on the part of the sender. In an on-going conversation, through a single user interface action such as touching a screen button, a switch, performing a gesture, speaking a command, creating an accelerometer event, etc, the user can commence a comment that uses the photo of a previous comment. Equally easily a photo can be taken (or selected from storage) and a comment created. This is in contrast to the many key presses that typing a title or subtitle would require.

The second cue is to provide an indication of sender while considering a particular comment. Two schemes are employed. The first (see FIG. 1) incorporates an inset image in the corner of the main message image 101 where this inset image 102 provides an indication of the sender such as a photograph of the sender (or an image presenting a more abstract relation to the sender such as a cartoon). The receiver may choose to display or suppress the display of the inset image based on need for that information. Variants on this scheme would change the position of inset photo or would alternate over time between message image and the image that provides an indication of sender.

Figure 2:
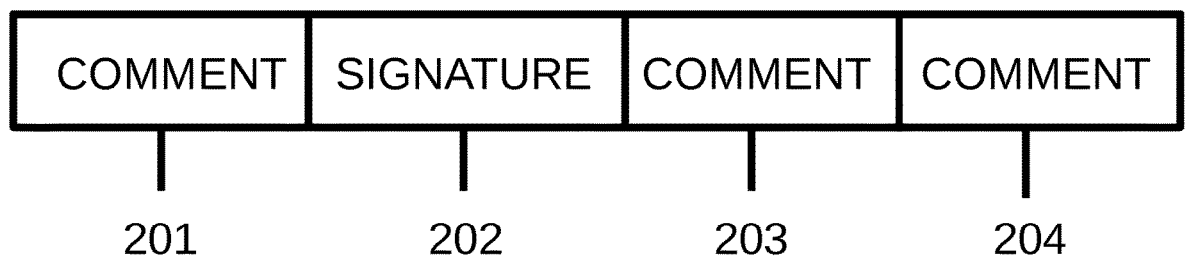
FIG. 2 Illustrates an embodiment of the sequence of voice data for an exemplary conversation. Time is presumed to move forward from the left to the right of the figure.

The second scheme adds a voice signature for the sender (voice annotation) preferably after the presentation of the comment. As shown in FIG. 2, this signature 202 is presented between comments 201, 203 and applies to the previous comment 201. This is the preferred position as it is while hearing a message that we become motivated to hear who the speaker is; the alternative where the signature is presented first forces us to try and remember the name of the speaker before we know if his/her comment is truly of interest. Note further in FIG. 2 that not all comments are presented with a voice signature in this example. This is due to the system recognizing a key property of voice; humans recognize familiar voices. Thus the sound message itself provides identification of the speaker for familiar speakers and a voice annotation does not appear between comments 203 and 204 as comment 203 is from a speaker well known by the user. The system can incorporate simple rules based on the number of messages previously listened to from a particular sender by the current user and infer that the user will trivially recognize the voice. Thus, the voice annotation can be discarded and the subsequent message be presented immediately after the message by the familiar user.

Figure 3:
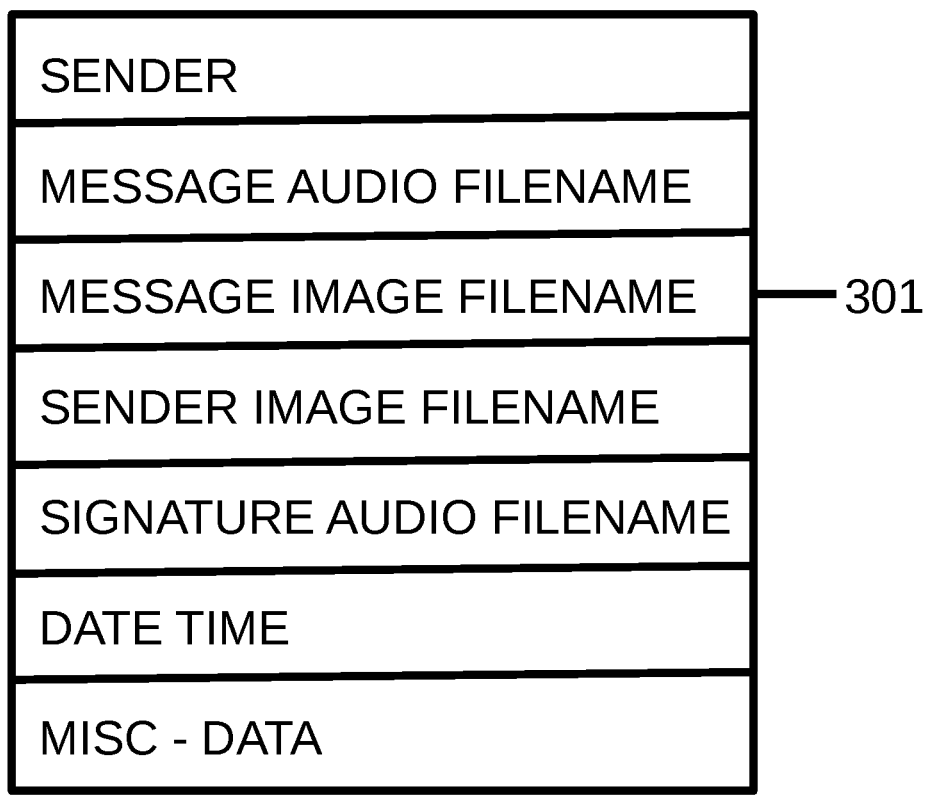
FIG. 3 Illustrates an embodiment of the comment descriptor, a data structure conveying a comment.

The preferred implementation features both cues: a photograph associated with every comment; and, an indication of sender featuring both inset sender associated photo and trailing voice signature. Also included in this patent application are less preferred implementations featuring: (a) a photograph associated with every comment and without a sender cue; (b) a photograph associated with every comment and, an indication of sender featuring inset sender associated photo without a trailing voice signature; and, (c) a photograph associated with every comment; and, an indication of sender featuring a trailing voice signature without inset sender photo. The preferred implementation represents each comment using a data structure as depicted in FIG. 3.

Figure 4:
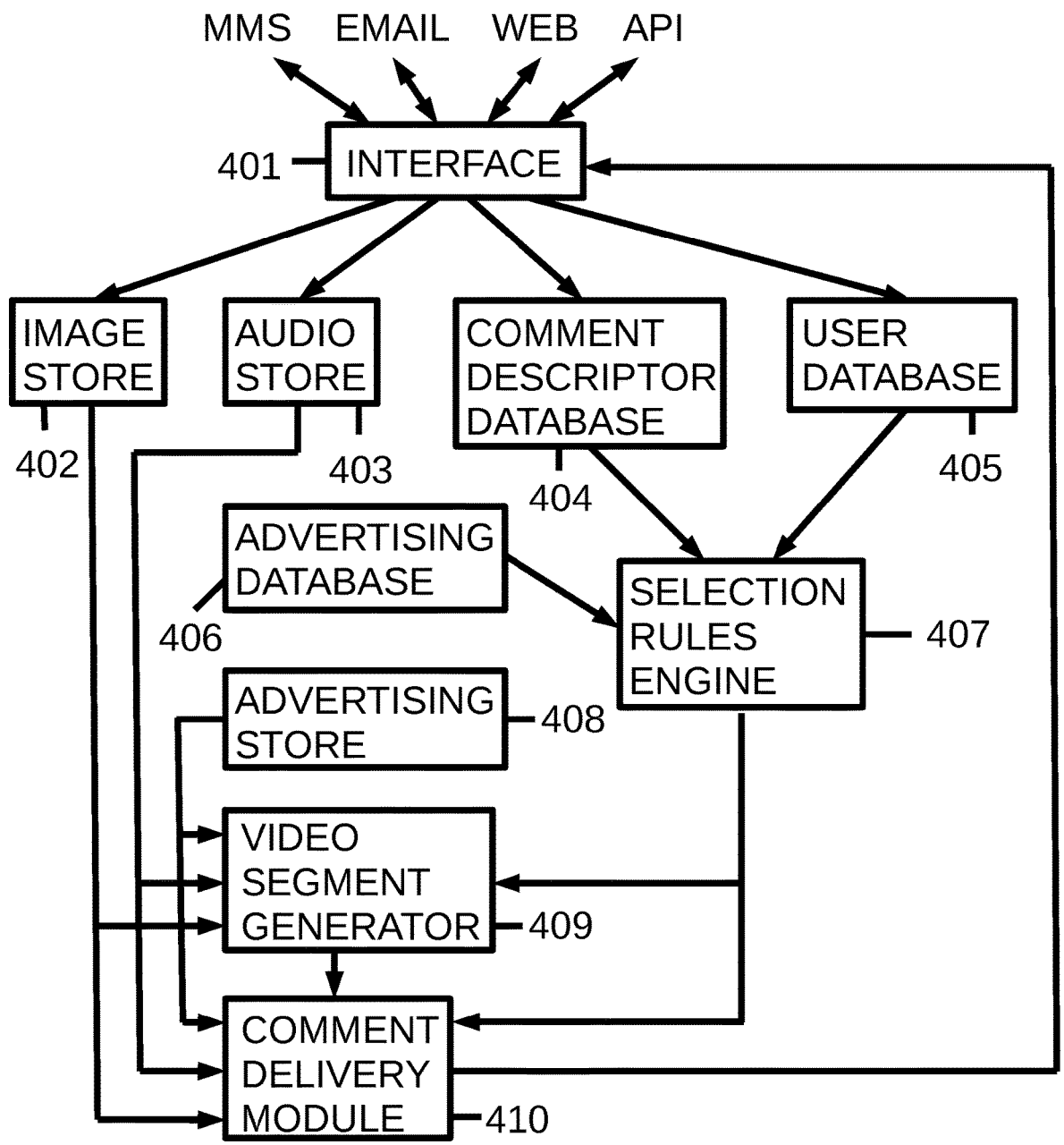
FIG. 4 illustrates one embodiment of a voice based social network.

As illustrated by FIG. 4, the instant system for voice based social networking receives an electronically encoded voice message (and frequently an image) and ultimately delivers it to one or multiple users. The voice and image may be captured (converted into data records) by various devices and the data transmitted to the system in a variety of formats such as Multimedia Messaging Service (MMS), email, web form input or Application Program Interface (API) call; it is assumed that other data of interest, such as sender identification and context data such as location may also be communicated to the system in some associated format. Interface 401 provides an electrically compatible interface as required by the sender's technology. Interface 401 is also responsible for converting the input information into a format acceptable to the rest of the system. Uploaded image and voice data are saved in image store 402 and audio store 403, respectively. Information about the image, audio and sender are entered into a comment descriptor structure of the form described in FIG. 3. This comment descriptor is then added to the comment descriptor database 404.

The selection rules engine 407 takes information from comment descriptor database 404, user database 405 and advertising database 406. Using this information it selects comments for forwarding to each particular user, as will be detailed further in this specification. The selection is forwarded to video segment generator 409 and to comment delivery module 410. For each selected comment, video segment generator 409 takes the corresponding images from image store 402 and audio from audio store 403 and converts them into a standard video fragment that may be formed into longer videos; some fragments may incorporate advertisements from advertising store 408 as directed by selection rules engine 407. For each selected comment, comment delivery module 410 considers the receiving users device capability to select the transfer of video and formatting, or, comment descriptor, audio and image data (and possibly advertisements from advertising store 408) as appropriate. Comment delivery module 410 forwards this output data to interface 401 for transmission to the user device in a form appropriate for the communications channel from system to user.

Figure 5:
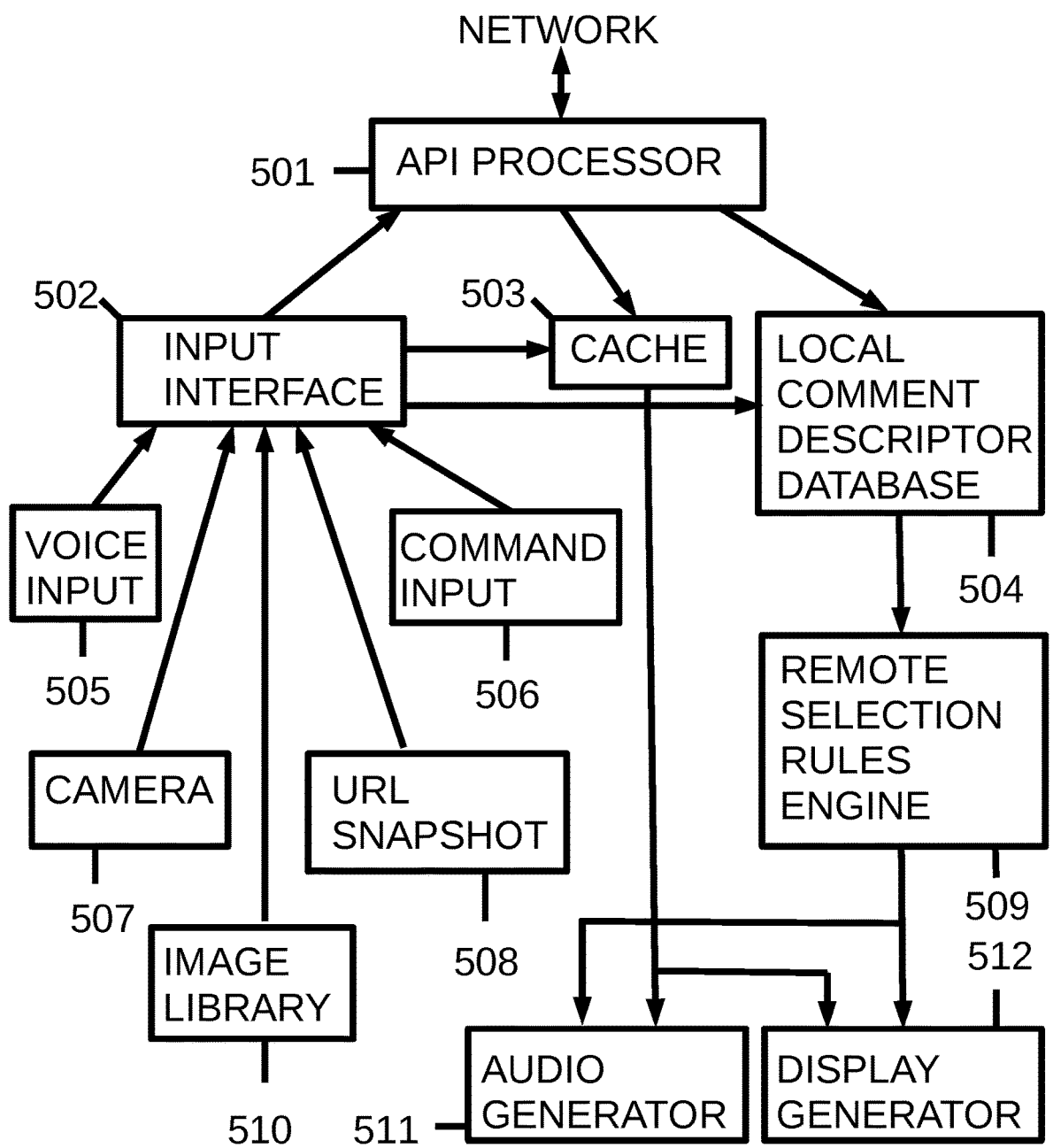
FIG. 5 illustrates an embodiment of the system functionality that resides in the user device for a voice based social network where part of the system functionality resides on the user device and part resides on the system servers.

FIG. 5 describes an alternative implementation that places some system functionality in a remote device such as a smartphone or tablet computer, with the remaining functionality resident in system servers attached to the internet. In the preferred implementation, the Application Programming Interface (API) serves to connect the device and server portions of the system. The server portion of the system retains the structure of FIG. 4 but some functions are performed in the user device with the cooperation of corresponding server modules. FIG. 5 details the functionality incorporated into the remote device implementation. In FIG. 5, API processor 501 provides for transfers over the network between servers and device, ensuring data compatible to each. Input interface 502 integrates voice input 505, camera 507, image library 510, URL snapshot 508 and command input 506 and creates and formats an information flow to the remainder of the system, both on the device (to cache 503 and local comment descriptor database 504) and on the system server(s). With the functionality encompassed by those blocks, the remote device records the message audio, takes or selects the message image, which may also be a snapshot of a browser screen for a particular URL, and receives commands from the user interface. Audio and image data are cached on the device in cache 503 to reduce the load on the data communication channel. Through the API, the system and device interact to maintain on the device a database of comment descriptors for comments deemed of possible interest to the user, local comment descriptor database 504. Remote selection rules engine 509 interacts with that database (and local user information) to select comments for presentation by audio generator 511 and display generator 512 using data stored in cache 503 or passed directly through cache 503 from the system servers via API processor 501.

Users can initiate a comment by selecting that mode through touching a screen button, a switch, performing a gesture, speaking a command, creating an accelerometer event, etc. They may then take a photo, select a photo from a file in a directory (on or off device) or paste a URL to discuss the contents of a webpage. In the latter case, with reference to the discussion of cues above, the webpage plays the same role as an image. The recording of their voice starts and it is terminated and the comment is transmitted to the service when the user touches a screen button, a switch, performs a gesture, speaks a command or creates an accelerometer event, etc. If the user does not explicitly select an image or URL, the audio recording starts immediately and proceeds as before with the exception that the comment will use the sender image as the message image. This sender image then becomes the root image for the identification of the present conversation; the system can internally identify this conversation using a combination of the image and a timestamp but, without sending further data, it is dependent on the recipients to disambiguate the conversation in this case.

In the case of a URL, the URL is stored in the message image filename 301 of the data structure (FIG. 3) and rendered as an image in the composite image. This ensures that the recipient will see what the sender saw and not what a dynamic web page may show at a later date. Trivially, the user interface allows for selecting the image by the recipient and redirection to the current web page with full browser access.

Users may contribute further comment to a particular comment that they have received or created. While listening to that particular comment, or after it if it is the last comment, the user can select to comment further through touching a screen button, a switch, performing a gesture, speaking a command, creating an accelerometer event, etc., The message image for the new comment will be set to match that of the particular comment and the audio recording will commence with the remainder of the process proceeding as described above. Other received comments may be commented on by the user by a process of selection that may involve conversation selection and scrolling to the specific received comment, again through touching a screen button, a switch, performing a gesture, speaking a command, creating an accelerometer event, etc., in some sequence, then treating said specific received comment as the particular comment and creating a new comment as described above.

Recognizing the finite capacity of the voice channel, the method calls for the application of rules to select and limit the voice data flowing to each user; rules prioritize the messages using context information such as, but not limited by, current conversations being shown the most interest by the user, importance of sender and current user state. Current user state may reflect time of day and, where provided by the device, location, acoustic and accelerometer data.

The method incorporates a selection rules engine that provides means to blend multiple conversations or parts of conversations (or both) without requiring user interaction at the level of individual comments. This module selects comments for forwarding to the user. On a best effort basis, it maintains a desired rate (comments per unit time) over certain periods. The periods may be by the minute, by the hour, by daytime, by night and by day as determined by system and user preferences. The input is the list of all comments from: other users of whom the user has expressed an interest; other users where the comment is on a subject to which the user has expressed an interest; other users where the comment is on a subject to which the system has inferred the user may find of interest; and, general system messages of timely importance. The selection of the comments is based on a user dependent score, described further below, wherein comments are ranked by this score and the highest ranked comments are selected for forwarding to the user and the remainder not selected so as to maintain the desired rate for the period.

The user dependent score incorporates a user dependent mathematical weighting of the source (user); a default weighting is used for sources not previously listened to by the user. It incorporates a user dependent mathematical weighting of the comment subject matter. Comment subject matter may possibly be inferred from text tags, audio tags, automated voice to text comment translation, image filename, image analysis, actively commenting users or other means to be determined. This process need not accurately identify the topic; rather, in the sense of clustering analysis, singular value decomposition (SVD), or other statistical process, determine an association that may have user interest.

The user dependent score is dynamic and can reflect changing user interests over time. Older comments receive a lower score as time passes. However, in an interval with few new comments, an older comment's user dependent score may be high enough to result in its selection for forwarding to the user, even though it had been rejected in an earlier period.

For pedagogical purposes, the following exemplary user dependent score algorithm is presented: (i) if the user has contributed to the comment's conversation enter 10 else enter 0; (ii) if the user has indicated interest in the topic enter 5 else if he has indicated disinterest enter −5; (iii) if the sender is a favourite enter 4 else enter 0; (iv) if the users environment has a sudden event such as the device accelerometer indicating a sudden move enter −100 else enter 0; (v) sum the results from steps (i-iv) to obtain the score. This score will be larger for a comment that the user wants to hear now. Note part (iv) provides a means to turn off comments in a potential emergency if the system further demands that the comment must exceed a threshold value (for example zero); this extension may be assumed to be incorporated into the scoring mechanism in the preferred implementation. Also note that in this example, the score components, where each step (i-iv) represents a component, had discrete values. A more general example would have components that are continuous variables. This invention calls for a scoring algorithm that is a general function of the chosen input criteria; a minimum implementation would feature a linear weighting of the selected components and those components having values reflecting the likely user perception of that component in that comment.

Advertising may also be integrated into the comment selection process. Advertising may appear as a comment such as one from any other user. Advertising may form an inset into the message image of a user comment. Advertising may be appended to the sender voice annotation. Any combination of the aforementioned methods for advertising may be used. The selection of advertising can be incorporated into the comment selection process with a user dependent score for the advertiser and advertisement subject; further, these face an additional weighting and selection process to limit the overall number and duration of advertisements.

Also available to the user is an interface for viewing a listing of all comments that may be accessed by the user, not just the ones selected above. The user may select a particular conversation from this listing. Here, a conversation is a sequence of comments from different users involved in the conversation. The selected conversation may then be played back to the user, flowing without interruption between comments, or, using the comment selection mechanism described above, giving comments in this conversation being played back a large weighting such that the playback will only be interrupted by the insertion of very highly weighted comments not belonging to said conversation.

A comment is forwarded to the recipient in one of two modes. In the first, the comment descriptor (FIG. 3) is forwarded to the recipient and the recipient's proxy, that is a browser, a web application or a device dependent installed application, requests the audio message, the message image, the sender image and voice annotation as specified in the comment descriptor. Note importantly that the message image, the sender image and voice annotation may be common for multiple comments and so an efficiency in terms of communication channel costs may be achieved by the browser, web application or device dependent installed application maintaining a copy of this data (caching) and requesting such data only when it does not currently have a copy of such data.

In the second mode, the comment is transformed into a composite such as a video segment or data format for representing audio-visual slide shows.

For the video segment, the result of this operation is the electronic equivalent of presenting the message image and, if selected, sender image composite image before a video camera and playing back the audio message and, if selected, audio annotation while the video camera was recording thus obtaining a video segment representing the comment. For other data formats, an entity is produced that is analogous to the video segment and any discussion regarding video segment my be assumed to apply as well to such data formats. The video segment may be joined to previous video segments forming an extended video segment and this composite sent to the end-point recipient directly as video or incorporated into another digital medium such as an email, MMS message or web page.

In the comment delivery module, information flow is translated into formats acceptable to the user's receiving device, ranging from a programmed sequence of views and sounds on a smartphone to a video on a web client.

The module provides the means to deliver a seamless flow of a (possibly) blended conversation without requiring user interaction to hear individual comments. In the case of the first mode, through markup and scripting language or through device application software, a portion of the module is resident on the device and is responsible for playing images sequentially, ensuring there are no gaps between images, and that the voice message may be played in its entirety while the fused composite image is displayed; voice annotation is inserted as described earlier. In the second case, the (blended) conversation (or fragment thereof) is rendered as a video, or video analogous data format and thus presents several comments (with voice annotation inserted as per FIG. 2 if desired) contiguously.

In the case of a wearable device (or other to be determined device) paired to another device where that second device maintains the primary connection to the system server(s), it may be that the comment is communicated in one mode between the first and second device and in another mode between the second device and the server(s). This would be to match different device capabilities, and in a particular case, optimize for the low power, low bandwidth, and low computational abilities of the wearable device. As well, the wearable device is also likely to have a low resolution display screen and so power, bandwidth and computational benefits will be realized as the system will send images at that low resolution. Similarly, the system will attempt to provide images at native device screen resolution, rather than the likely higher resolution available for the photo on the sender's device, for all users thus beneficially providing users with a cost saving with respect to user service provider data charges. Higher resolution images can be obtained from the sender's device when a recipient specifically requests it by engaging the user interface to, for example, zoom into the image.

The above merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudo-code, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. The applicant thus regards any means which can provide those functionalities as equivalent as those shown herein.

What is claimed is:

1. A method for voice-based social networking, comprising:
- Receiving a plurality of voice message segments, wherein each voice message segments of said plurality of voice message segments encodes a different comment, each comment having a speaker who recorded said comment;
- Presenting said plurality of voice message segments in sequence;
- Generating, for each of said plurality of voice message segments, a corresponding segment of audio identifying the speaker of the preceding or subsequent voice message segment;
- Inserting in between each of said plurality of voice message segments said corresponding segment of audio identifying the speaker of the preceding or subsequent voice message segment, forming an extended composite of alternating said plurality of voice message segments and said corresponding segments of audio; and
- Playing said extended composite to a user.

2. The method of claim 1, wherein the user monitors a plurality of overlapping conversations, and further comprising:
- Retrieving for each of said plurality of voice message segments an image indicating the conversation to which said voice message segment belongs, where said image is one of the most recently uploaded image in a temporal sequence of voice messages of said conversation and the first image uploaded in said conversation; and,
- Presenting said image to the user while the section of said extended composite corresponding to said voice message segment is played.

3. The method of claim 1, wherein the user monitors a plurality of overlapping conversations, and further comprising:
- Forming for each of said plurality of voice message segments a composite image incorporating an image representing the speaker of the current voice message segment and a second image indicating the conversation to which the current voice message segment belongs, wherein said second image is one of the most recently uploaded image in a temporal sequence of voice messages of said conversation and the first image uploaded in said conversation; and,
- Presenting said composite image to the user while the section of said extended composite corresponding to said comment is played.

4. The method of claim 1, wherein after using said corresponding segment of audio identifying the speaker for a first group comprising one or a plurality of voice segments, for a second group comprising one or a plurality of segments subsequent to said first group the presentation of the conversation does not include said corresponding segment of audio identifying the speaker and relies on the speaker's voice as represented in said voice segments in said second group to be sufficient for the recipient to identify said speaker.

5. A method for voice-based social networking, comprising:
- Receiving a plurality of voice message segments, wherein each voice message segments of said plurality of voice message segments encodes a different comment, each comment having a speaker who recorded said comment;
- Presenting said plurality of voice message segments in sequence;
- Retrieving a corresponding segment of audio identifying the speaker of the preceding or subsequent voice message segment; and,
- Inserting in between each of said plurality of voice message segments said corresponding segment of audio identifying the speaker of the preceding or subsequent voice message segment, forming an extended composite of alternating said plurality of voice message segments and said corresponding segments of audio; and
- Playing said extended composite to a user.

6. The method of claim 5, wherein the user monitors a plurality of overlapping conversations, and further comprising:
- Retrieving for each of said plurality of voice message segments an image indicating the conversation to which said voice message segment belongs, where said image is one of the most recently uploaded image in a temporal sequence of voice messages of said conversation and the first image uploaded in said conversation; and,
- Presenting said image to the user while the section of said extended composite corresponding to said voice message segment is played.

7. The method of claim 5, wherein the user monitors a plurality of overlapping conversations, and further comprising:
- Forming for each of said plurality of voice message segments a composite image incorporating an image representing the speaker of the current voice message segment and a second image indicating the conversation to which the current voice message segment belongs, wherein said second image is one of the most recently uploaded image in a temporal sequence of voice messages of said conversation and the first image uploaded in said conversation; and,
- Presenting said composite image to the user while the section of said extended composite corresponding to said comment is played.

8. The method of claim 5, wherein after using said corresponding segment of audio identifying the speaker for a first group comprising one or a plurality of voice segments, for a second group comprising one or a plurality of segments subsequent to said first group the presentation of the conversation does not include said corresponding segment of audio identifying the speaker and relies on the speaker's voice as represented in said voice segments in said second group to be sufficient for the recipient to identify said speaker.

* * * * *